(12) United States Patent
Ogata et al.

(10) Patent No.: US 9,725,030 B2
(45) Date of Patent: Aug. 8, 2017

(54) VEHICLE LIGHT AND VEHICLE EQUIPPED WITH VEHICLE LIGHT

(71) Applicant: Panasonic Intellectual Property Management Co., Ltd., Osaka (JP)

(72) Inventors: Tomoyuki Ogata, Osaka (JP); Tomoyuki Nakano, Osaka (JP); Yasufumi Shirakawa, Osaka (JP); Hiro Aoki, Osaka (JP); Toshifumi Tanaka, Osaka (JP); Yuki Nishida, Hyogo (JP); Kazuki Masuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/049,540

(22) Filed: Feb. 22, 2016

(65) Prior Publication Data

US 2016/0193955 A1     Jul. 7, 2016

Related U.S. Application Data

(63) Continuation-in-part of application No. 14/454,067, filed on Aug. 7, 2014, now Pat. No. 9,303,838.

(30) Foreign Application Priority Data

Aug. 26, 2013   (JP) ................................ 2013-174260

(51) Int. Cl.
*F21V 9/00*      (2015.01)
*F21V 33/00*     (2006.01)
(Continued)

(52) U.S. Cl.
CPC ......... *B60Q 1/0041* (2013.01); *B60Q 1/0052* (2013.01); *B60Q 1/0058* (2013.01);
(Continued)

(58) Field of Classification Search
CPC .. B60Q 1/0041; B60Q 1/0058; B60Q 1/2607; B60Q 1/0052; B60Q 1/0035; B60Q 1/28;
(Continued)

(56) References Cited

U.S. PATENT DOCUMENTS 6,361,180 B1   3/2002   Iimura
9,039,260 B2   5/2015   Faffelberger
(Continued)

FOREIGN PATENT DOCUMENTS

FR   WO 2013011468 A1 *  1/2013  ........... B60Q 1/0052
JP        2012-243539 A    12/2012

OTHER PUBLICATIONS

Co-pending U.S. Appl. No. 14/454,067, filed Aug. 7, 2014.

*Primary Examiner* — Donald Raleigh
(74) *Attorney, Agent, or Firm* — Renner, Otto, Boisselle & Sklar, LLP

(57) ABSTRACT

A vehicle light installed in a vehicle includes: a main case having a front opening; a first light guide disposed in the main case; a first light source that emits light into the first light guide; and a headlamp disposed in the main case. The first light guide (i) is rod-shaped, (ii) includes a first extended section extending from the inboard side of the first light guide relative to the vehicle widthwise direction toward the outboard side and a second extended section that continues from the first extended section, curves back inwardly, and extends to the inboard side, and (iii) opens toward a longitudinal center line of the vehicle. The headlamp is disposed between the first extended section and the second extended section. The first extended section and the second extended section extend toward the longitudinal center line of the vehicle to a point beyond the headlamp.

6 Claims, 9 Drawing Sheets

(51) Int. Cl.
*B62J 6/00* (2006.01)
*B60Q 1/00* (2006.01)
*B60Q 1/28* (2006.01)
*F21S 8/10* (2006.01)
*B60Q 1/26* (2006.01)
*B60Q 1/32* (2006.01)

(52) U.S. Cl.
CPC ........... *B60Q 1/2607* (2013.01); *B60Q 1/28* (2013.01); *B60Q 1/32* (2013.01); *F21S 48/215* (2013.01); *F21S 48/2237* (2013.01); *F21S 48/2243* (2013.01); *F21S 48/2268* (2013.01); *F21S 48/2281* (2013.01); *F21S 48/2287* (2013.01)

(58) Field of Classification Search
CPC .. F21S 48/2281; F21S 48/215; F21S 48/2287; F21S 48/2268; F21S 48/2237; F21S 48/2243
See application file for complete search history.

(56) References Cited

U.S. PATENT DOCUMENTS

| | | | | |
|---|---|---|---|---|
| 2010/0309677 | A1* | 12/2010 | Kazaoka | B60Q 1/2665 362/519 |
| 2012/0069592 | A1* | 3/2012 | Natsume | B60Q 1/0052 362/511 |
| 2013/0044503 | A1* | 2/2013 | Mihara | F21S 48/1241 362/511 |
| 2013/0128601 | A1 | 5/2013 | Kim | |
| 2014/0247616 | A1* | 9/2014 | Arrivet | B60Q 1/0052 362/511 |

* cited by examiner

VEHICLE LIGHT AND VEHICLE EQUIPPED WITH VEHICLE LIGHT

CROSS REFERENCE TO THE RELATED APPLICATION

This application claims the benefit of priority of Japanese Patent Application Number 2013-174260, filed Aug. 26, 2013, the entire content of which is hereby incorporated by reference.

TECHNICAL FIELD

The present disclosure relates to vehicle lights and vehicles equipped with vehicle lights.

BACKGROUND ART

Conventionally, relevant vehicle lights are positioned at vehicle widthwise left and right sides of the front and back of the vehicle. These vehicle lights are illuminated to indicate the presence or the size (width) of the vehicle.

In recent years, vehicle lights that use light guides to increase the area of illumination in an effort to make recognition of the presence or size (width) of the vehicle easier have appeared (for example, see Japanese Unexamined Patent Application Publication No. 2012-243539).

For example, a vehicle light using a light guide includes a main case having a front opening, a light guide disposed in the main case, a light source that emits light into the light guide, and a translucent cover fitted to cover the opening of the main case.

The light guide is, for example, a rod-shaped light guide that, when the main case is installed in the vehicle, extends outward in the widthwise direction of the vehicle, curves back in a U shape, and then continues to extend inward in the widthwise direction of the vehicle.

The light guide having this sort of shape has a predetermined length in the widthwise direction of the vehicle, giving it a visible presence.

SUMMARY

However, with a conventional light guide, there is a problem that the recognition rate of the width of the vehicle is poor.

An object of one aspect of the present invention is to improve the recognition rate of the width of the vehicle.

In order to achieve this object, the vehicle light according to one aspect of the present invention is installed in a vehicle and includes: a main case having a front opening; a first light guide disposed in the main case; a first light source that emits light into the first light guide; and a headlamp disposed in the main case. The first light guide (i) is rod-shaped, (ii) includes a first extended section extending from the inboard side of the first light guide relative to the vehicle widthwise direction toward the outboard side and a second extended section that continues from the first extended section, curves back inwardly, and extends to the inboard side, and (iii) opens toward a longitudinal center line of the vehicle. The headlamp is disposed between the first extended section and the second extended section. The first extended section and the second extended section extend toward the longitudinal center line of the vehicle to a point beyond the headlamp.

According to one aspect of the present invention, it is possible to improve the recognition rate of the width of the vehicle.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION

Figure 1:
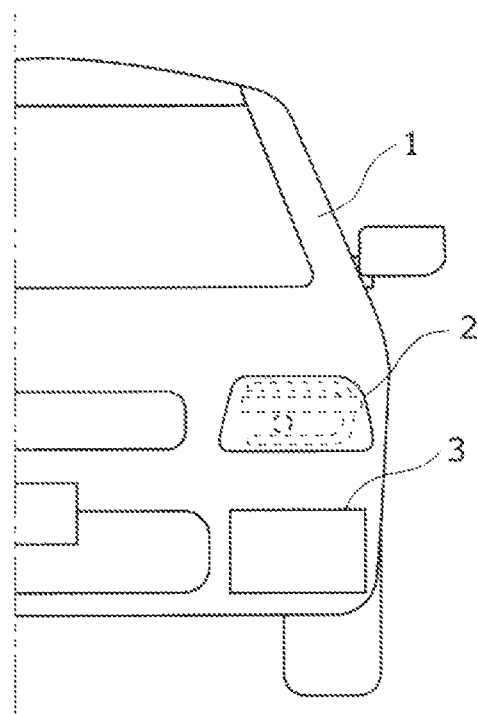
FIG. 1 is a front view of the left half of a vehicle equipped with a vehicle light according to an example of the present invention.

Hereinafter an exemplary embodiment of the present invention will be described with reference to the Drawings. The following exemplary embodiment shows a general or specific example. The numerical values, shapes, materials, structural elements, the arrangement and connection of the structural elements, steps, the processing order of the steps etc. shown in the following exemplary embodiment are mere examples, and therefore do not limit the present invention. Therefore, among the structural elements in the following exemplary embodiments, structural elements not recited in any one of the independent claims defining the most generic part of the inventive concept are described as arbitrary structural elements.

Moreover, the Drawings are schematic drawings, and are not necessarily exact depictions. Moreover, in the Drawings, elements having the same essential configuration share the same reference numerals, and multiple descriptions thereof are omitted or abridged.

Embodiment

First, a vehicle 1 according to an embodiment of the present invention will be described with reference to FIG. 1. FIG. 1 is a front view of the left half of a vehicle equipped with a vehicle light according to an embodiment of the present invention.

As is illustrated in FIG. 1, the vehicle 1 is one example of an automobile, and is, for example, a four-wheeled vehicle such as gasoline powered vehicle or an electric vehicle. Vehicle lights 2 are provided on the left and right sides of the front of the vehicle 1. The vehicle lights 2 are, for example, vehicle lighting apparatuses having a function of, for example, illuminating an area in front of vehicle 1 and indicating the width of the vehicle. Moreover, vehicle lights 3 for indicating the width of the vehicle are arranged below the vehicle lights 2. The vehicle lights 3 are, for example, DRLs (daylight running lamps/daytime running lights) or fog lamps.

It should be noted that only the left half of the vehicle 1 is shown in FIG. 1, but the vehicle light 2 and the vehicle light 3 are also provided on the right half as well. In other words, the vehicle light 2 and the vehicle light 3 are disposed to a left and right of a longitudinal center line of the vehicle.

Figure 2:
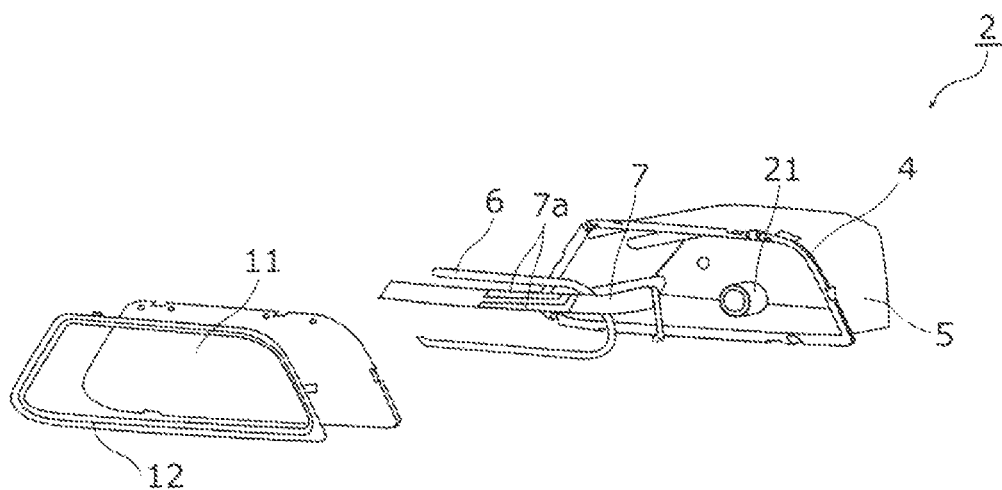
FIG. 2 is an exploded perspective view of a vehicle light according to an example of the present invention.
Figure 3:
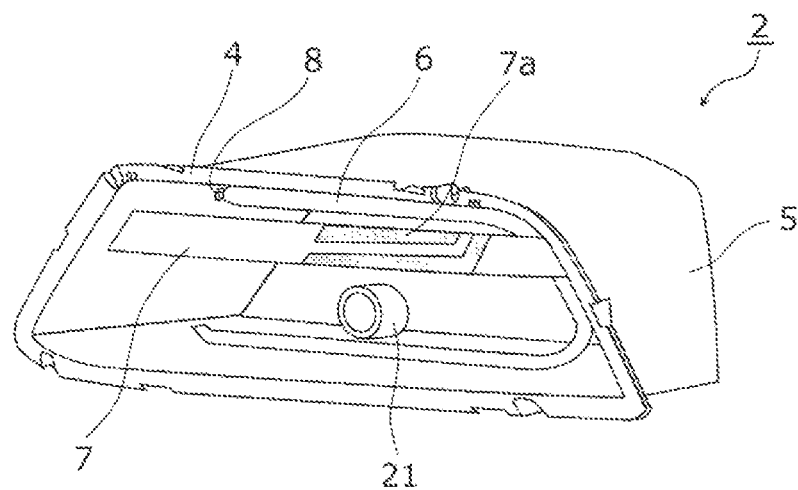
FIG. 3 is a perspective view of relevant components of a vehicle light according to an example of the present invention.
Figure 4:
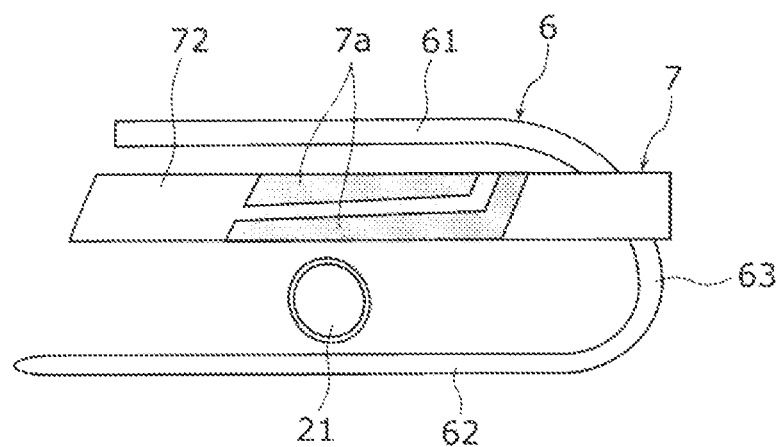
FIG. 4 is a front view illustrating a first light guide, a second light guide, and a headlamp in a vehicle light according to an example of the present invention.
Figure 5:
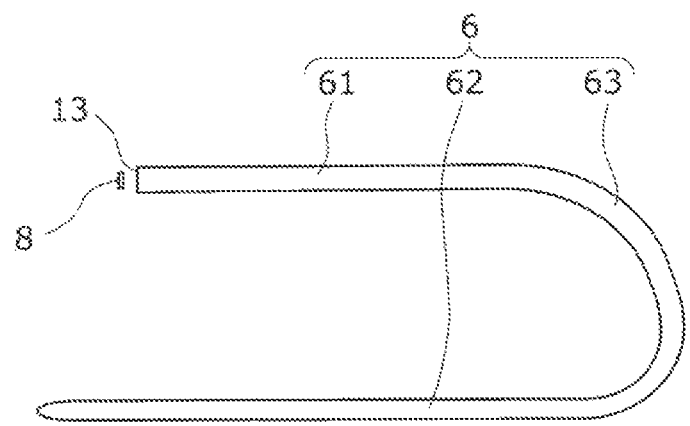
FIG. 5 is a perspective view of a first light guide in a vehicle light according to an example of the present invention.
Figure 6:
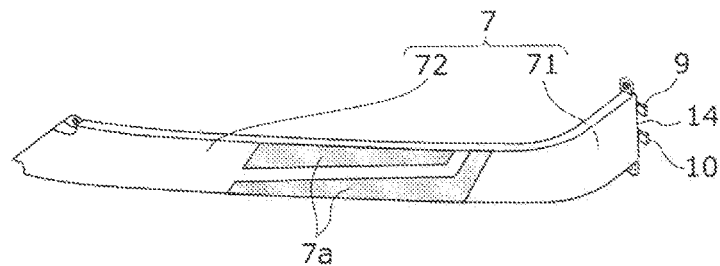
FIG. 6 is a perspective view of a second light guide in a vehicle light according to an example of the present invention.

Next, the vehicle light 2 according to an embodiment of the present invention will be described with reference to FIG. 2 though FIG. 6. FIG. 2 is an exploded perspective view of a vehicle light according to an embodiment of the present invention. FIG. 3 is a perspective view of relevant components of the vehicle light, showing a first light guide and a second light guide disposed inside a main case. FIG. 4 is a front view illustrating a first light guide, a second light guide, and a headlamp in the vehicle light. FIG. 5 is a perspective view of the first light guide in the vehicle light. FIG. 6 is a perspective view of the second light guide in the vehicle light.

As is illustrated in FIG. 2 and FIG. 3, the vehicle light 2 includes a main case 5 having a front opening 4, a first light guide 6 and a second light guide 7 disposed in the main case 5, a light source (not shown in FIG. 2 or FIG. 3) that emits light into the first light guide 6 and the second light guide 7, a translucent cover 11 fitted to cover the opening 4 of the main case 5, a frame 12 for attaching the cover 11 to the main case 5, and a headlamp 21 disposed in the main case 5.

Moreover, the vehicle light 2 according to this embodiment includes, as the light source that emits light into the first light guide 6 and the second light guide 7, a light source 8 shown in FIG. 5 and light sources 9 and 10 shown in FIG. 6. The light source 8 is a first light source that emits light into the first light guide 6. The light sources 9 and 10 are second light sources that emit light into the second light guide 7.

As is illustrated in FIG. 1 through FIG. 5, the first light guide 6 is a rod-like component having a curve so as to be substantially U-shaped. The first light guide 6 is, for example, made of a translucent resin material such as polycarbonate or acrylic resin.

The first light guide 6 is rod-shaped and includes: a first extended section 61 (first rod-shaped extended section) that has a substantially slender cylindrical shape and extends from the inboard side of the first light guide relative to the widthwise direction of the vehicle toward the outboard side of the first light guide relative to the widthwise direction of the vehicle; and a second extended section 62 (second rod-shaped extended section) that has a substantially slender cylindrical shape, continues from the first extended section 61, curves back inward, and extends to the inboard side. In other words, the first light guide 6 is a substantially U-shaped rod-like component arranged on its side so that the "U" opens toward the longitudinal center line of the vehicle 1.

More specifically, the first light guide 6 is, for example, a cylindrical light guide that, when the main case 5 is installed in the vehicle 1, extends from the inboard side of the first light guide relative to the widthwise direction of the vehicle toward the outboard side of the first light guide relative to the widthwise direction of the vehicle, bends in a U shape, and then continues to extend from the outboard side of the first light guide relative to a widthwise direction of the vehicle toward the inboard side of the first light guide relative to the widthwise direction of the vehicle.

In this embodiment, the first extended section 61 and the second extended section 62 are arranged vertically so as to be substantially parallel to each other. Moreover, the outboard end portions of the first extended section 61 and the second extended section 62 in the widthwise direction of the vehicle 5 are connected together at a U-shaped portion 63 of the first light guide 6, which is the portion of the first light guide 6 that curves back.

As illustrated in FIG. 4, the first extended section 61 and the second extended section 62 extend toward the longitudinal center line of the vehicle 1 to a point beyond the headlamp 21. In other words, the ends of the first extended section 61 and the second extended section 62 at the inboard sides relative to the widthwise direction of the vehicle are located closer to the longitudinal center line of the vehicle 1 than an end of the headlamp 21 at the inboard side relative to the widthwise direction of the vehicle.

The first light guide 6 includes, on the inboard side thereof in the widthwise direction of the vehicle, a light-incident portion 13 (first light-incident portion) on which light from the light source 8 is incident. In other words, the inboard side of the first light guide 6 in the widthwise direction of the vehicle is the light-incident portion 13. Moreover, the light source 8 is disposed across from the light-incident portion 13. It should be noted that the light-incident portion 13 is an unobstructed end of the first extended section 61, and the light source 8 is disposed across from the end surface of the first extended section 61.

It should be noted that an LED (light-emitting element) that emits, for example, white light, may be used as the light source 8. The light source 8 is configured as a LED module including, for example, a substrate, an LED chip, and a wavelength converting material (for example, phosphor). The light source 8 is fixed to a predetermined component such as the main case 5.

Conversely, as is illustrated in FIG. 1 through FIG. 4 and FIG. 6, the second light guide is plate-shaped and disposed so as to pass in front of or behind the U-shaped portion of the first light guide 6. The second light guide 7 is, for example, made of a translucent resin material such as polycarbonate or acrylic resin.

In this embodiment, the second light guide 7 is a plate-shaped component that extends from a position further outboard than the U-shaped portion 63 of the first light guide 6 (the most outboard portion of the first light guide 6 relative to the widthwise direction of the vehicle), passes in front of this portion of the first light guide 6, and extends to the inboard side relative to the widthwise direction of the vehicle.

More specifically, the second light guide 7 includes a plate-shaped first extended section 71 (first plate-shaped extended section) that extends from a rearward portion of the main case 5 toward the opening 4 (that is to say, forward), and a second extended section 72 (second plate-shaped extended section) that bends from the first extended section 71 and extends to the inboard side relative to the widthwise direction of the vehicle. As illustrated in FIG. 4, the second extended section 72, which is a section of the second light guide 7, is disposed between the first extended section 61 and the second extended section 62 of the first light guide 6.

It should be noted that the boundary between the first extended section 71 and the second extended section 72, which is a bent portion, curves so as to have a curvature. Moreover, the outer surface of the first extended section 71 is disposed across from the inner surface of the main case 5, and the outer surface of the second extended section 72 is disposed across from the plane of the opening 4.

The first light guide 6 and the second light guide 7 cross each other in the U-shaped portion 63 of the first light guide 6 and in the bent portion of the second light guide 7. Moreover, in a front view of the vehicle light 3, the second extended section 72 of the second light guide 7 is disposed so as to be positioned between the first extended section 61 and the second extended section 62 of the first light guide 6.

The second light guide 7 includes, on an outboard side thereof in the widthwise direction of the vehicle, a light-incident portion 14 (second light-incident portion) on which light from the light sources 9 and 10 is incident. In other words, the outboard side of the second light guide 7 in the widthwise direction of the vehicle is the light-incident portion 14. Moreover, the light sources 9 and 10 are disposed across from the light-incident portion 14. It should be noted that the light-incident portion 14 is a free end of the first extended section 71, and the light sources 9 and 10 are disposed across from the end surface of the first extended section 71.

The light source 9 is a first light-emitting element that lights up to indicate the width of the vehicle, and the light source 10 is a second light-emitting element for a turn signal indicator that lights up to indicate a direction. It should be noted that a LED (light-emitting element) that emits, for example, white light, may be used as the light source 9. Moreover, it should be noted that a LED (light-emitting element) that emits, for example, amber light, may be used as the light source 10. The light sources 9 and 10 are configured as LED modules including, for example, a substrate, an LED chip, and a wavelength converting material (for example, phosphor). The light sources 9 and 10 are fixed to a predetermined component such as the main case 5.

Moreover, the rear (back) surface of the second light guide 7 includes a textured portion for emitting, to the front surface side of the second light guide 7, the light guided by the second light guide 7. More specifically, the textured portion is formed on part of the rear surface of the second extended section 72 of the second light guide 7. In other words, the textured portion is selectively formed on a surface of the second light guide 7. The textured portion may be formed on the front surface instead of the rear surface, but is preferably formed on the rear surface. By forming the textured portion on the rear surface of the second light guide 7, the light guided by the second light guide 7 can be emitted in a desired direction toward the front surface via the textured portion. The hatched region 7a of spaced dots in FIG. 2 through FIG. 4 and FIG. 6 indicates the region in which the textured portion is formed. The textured portion is composed of, for example, a plurality of minute dot-like depressions. The textured portion may be a light dispersing portion having light dispersing characteristics, and may be a light distribution control portion that controls the distribution of light, such as a microprism, and may be a combination of these.

In this way, by forming a textured portion on a surface of the second light guide 7, the light guided by the second light guide 7 can be emitted to the front surface side in the region 7a. With this, the illumination of the second light guide 7 at the region 7a can be made to be more intense than other regions of the second light guide 7. In other words, the intensity of the illumination of the second light guide 7 can be selectively emphasized.

Moreover, the region 7a in which the textured portion is formed is a design that represents turn signal information when the light source 9 or 10 emits light. In other words, the design of the region 7a in which the textured portion is formed represents information indicating a turn signal. In this embodiment, the region 7a in which the textured portion is formed is divided into two regions, one along each of the edges intersecting the widthwise direction (the top and bottom edges in the drawings) of the second extended section 72. More specifically, the region 7a in which the textured portion is formed is formed in two parts along the lengthwise direction of the second extended section 72, and between the two parts of the region 7a, there is a region in which the textured portion is not formed.

Note that the textured portion in the region 7a is exemplified as being composed of a plurality of minute depressions, but the region 7a is not limited to this example. For example, the region 7a may be composed of a plurality of minute protuberances, and may be composed of a combination of depressions and protuberances. Moreover, the shape of the region 7a in which the textured portion is formed is not limited to a design that represents a turn signal. For example, the shape of the region 7a may be any design such as a character or graphic.

The headlamp 21 is a lamp that has a function of illuminating an area in front of the vehicle 1, and is capable of switching between emitting a low beam, which is a passing beam, and a high beam, which is a driving beam.

As illustrated in FIG. 4, in a front view, the headlamp 21 is disposed between the first light guide 6 and the second light guide 7. Moreover, in a front view, the headlamp 21 is disposed between the first extended section 61 and the second extended section 62. Thus, the headlamp 21 is disposed between (i) the first extended section 61 or the second extended section 62 and (ii) the second light guide 7 (the second extended section 72). In this embodiment, in a front view, the headlamp 21 is disposed between the second extended section 62 of the first light guide 6 and the second extended section 72 of the second light guide 7.

Figure 7:
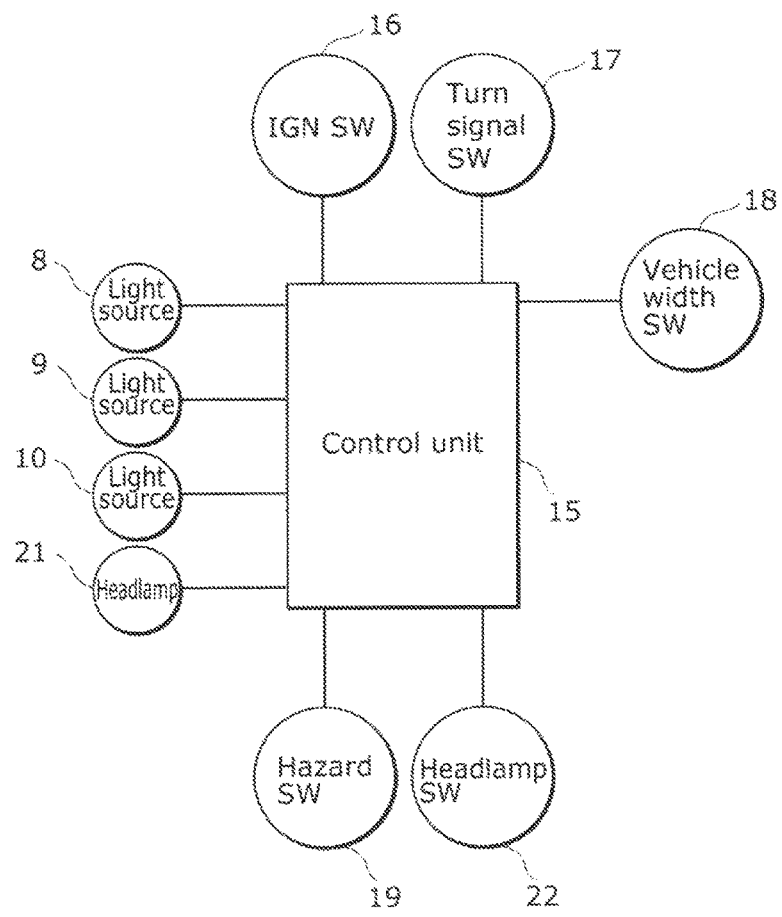
FIG. 7 is a block diagram illustrating control of a vehicle light according to an example of the present invention.

Moreover, as is illustrated in FIG. 7, the light source 8, which emits light into the first light guide 6, and the light sources 9 and 10, which emit light into the second light guide 7, are connected to a control unit 15. FIG. 7 is a block diagram illustrating control of the vehicle light according to an embodiment of the present invention.

The control unit 15 is connected to an ignition switch (IGN SW) 16, a turn signal switch (turn signal SW) 17, a vehicle width switch (vehicle width SW) 18, and a hazard switch (hazard SW) 19.

Figure 8:
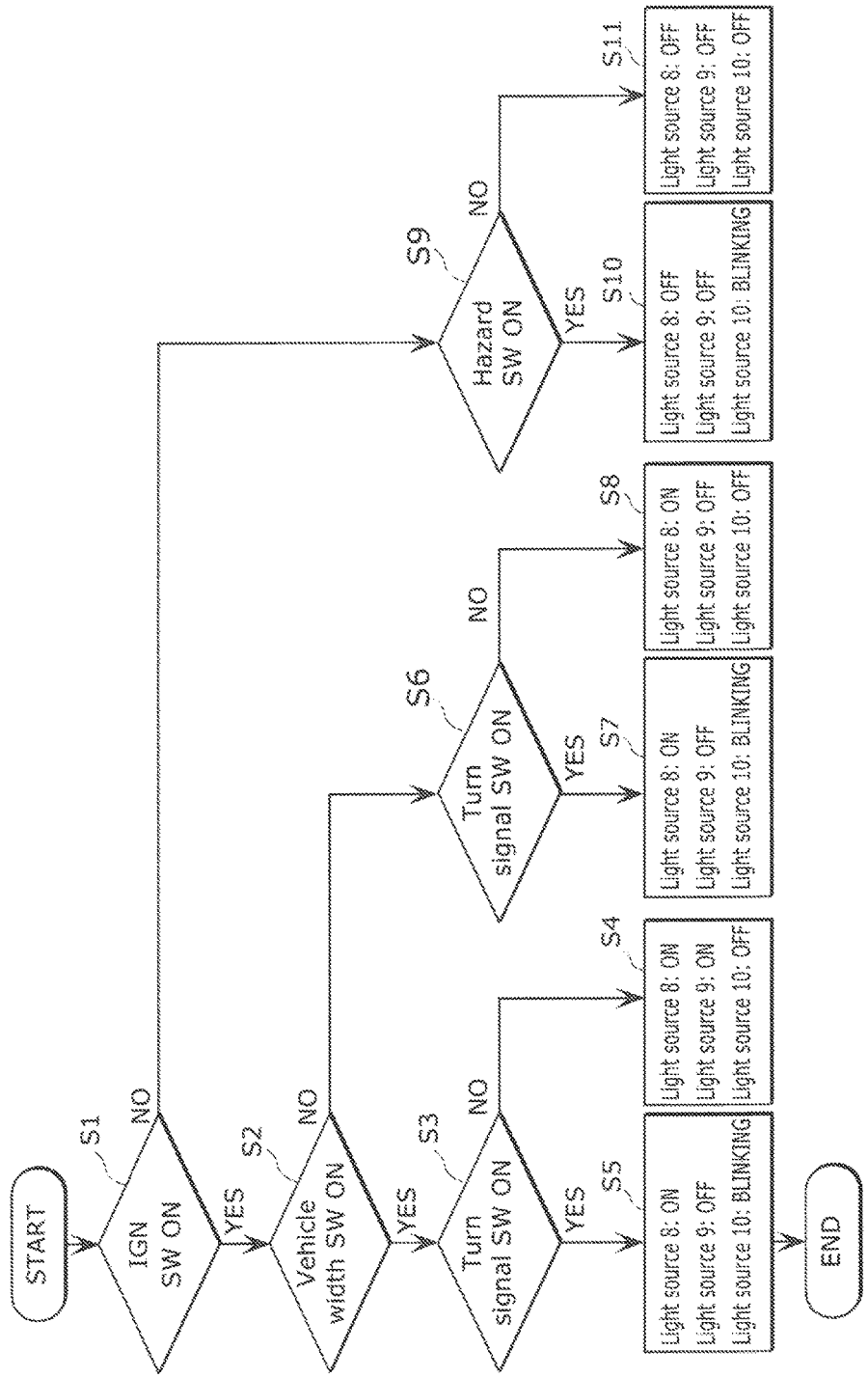
FIG. 8 is a flow chart illustrating operation of a vehicle light according to an example of the present invention.

Here, the operation of the vehicle light 2 will be explained with reference to FIG. 8. FIG. 8 is a flow chart illustrating operation of the vehicle light according to an embodiment of the present invention.

For example, when a user gets in the vehicle 1 and turns the ignition switch 16 ON (51 in FIG. 8), the engine (not shown in the Drawings) starts. In this state, regardless of it being daytime or nighttime, the light source 8 turns on.

When the ignition switch 16 is ON (YES in S1 in FIG. 8) and further the vehicle width switch 18 is turned ON (YES in S2 in FIG. 8), illumination of the light source 9 is controlled by the control unit 15.

When the vehicle width switch 18 is ON, since the turn signal switch 17 is not used when the vehicle is moving directly forward (NO in S3 in FIG. 8), the control unit 15 turns the light source 9 ON (S4 in FIG. 8). In other words, when the vehicle width switch 18 is ON and the turn signal switch 17 is OFF (NO in S3 in FIG. 8), the light source 9 is ON. As such, in this case, the light sources 8 and 9 are ON, and the light source 10 is OFF.

When the light sources 8, 9, and 10 are in this particular combination of ON and OFF states, light from the light source 8 is incident on the light-incident portion 13 of the first light guide 6, resulting in illumination of the entire first light guide 6. In other words, the incident light from the light source 8 first passes through the first extended section 61 followed by the U-shaped portion 63, and then the second extended section 62, whereby light is emitted from the entire first light guide 6.

On the other hand, light from the light source 9 is incident on the light-incident portion 14 of the second light guide 7, resulting in illumination of the entire second light guide 7. In other words, the incident light from the light source 9 is first transmitted through the first extended section 71 and then the second extended section 72 so as to start from a position further outboard in the widthwise direction of the vehicle than the U-shaped portion 63 of the first light guide 6 and pass in front of the first light guide 6, resulting in illumination of the entire second light guide 7.

When both the light sources 8 and 9 are turned ON, since the first light guide 6 and the second light guide 7 cross each other at the U-shaped portion 63 of the first light guide 6, the light is brighter in this cross-over region than other regions of the first light guide 6 and second light guide 7. As a result, it is possible to improve the recognition rate of the width of the vehicle.

It should be noted that the shape of the region in which the light is brighter is the shape of the overlapping portion of the first light guide 6 and the second light guide 7. In this embodiment, the region in which the light is brighter is a vertical rectangle located at the outboard end in the widthwise direction of the vehicle on the as is illustrated in FIG. 1.

Moreover, when both the light sources 8 and 9 are ON in S3 in FIG. 8 and the turn signal switch 17 is activated so that the turn signal switch 17 is ON (YES in S3 in FIG. 8), the control unit 15 turns OFF the light source 9 and causes the light source 10 to blink (S5 in FIG. 8).

In other words, when the vehicle width switch 18 and the turn signal switch 17 are ON (YES in S3 in FIG. 8), the light source 8 is ON, the light source 9 is OFF, and the light source 10 is blinking. With this, the second light guide 7 functions as a turn signal indicator by repeatedly blinking amber light from the light source 10.

At this time, as a result of the second light guide 7 covering the front of the U-shaped portion 63 of the first light guide 6, the region of blinking amber light from the light source 10 is not blocked by the U-shaped portion 63 of the first light guide. As such, it is possible for the second light guide 7 to properly function as a turn signal indicator.

It should be noted that in this embodiment, in S2 in FIG. 8, even if the vehicle width switch 18 is OFF (NO in S2 in FIG. 8), when the turn signal switch 17 is ON (YES in S6 in FIG. 8), the control unit 15 turns OFF the light source 9 and causes the light source 10 to blink (S7 in FIG. 8). In other words, in this case, the light source 8 is ON, the light source 9 is OFF, and the light source 10 is blinking.

It goes without saying that when the vehicle width switch 18 is OFF, the light sources 9 and 10 are both OFF (S8 in FIG. 8) when the turn signal switch 17 is OFF (NO in S6 in FIG. 8). In other words, in this case, the light source 8 is ON and the light sources 9 and 10 are OFF.

Moreover, even if the ignition switch 16 is OFF (NO in S1 in FIG. 8), when the hazard switch 19 is ON (YES in S9 in FIG. 8), the control unit 15 turns OFF the light source 9 and causes the light source 10 to blink (S10 in FIG. 8). In other words, in this case, the light sources 8 and 9 are OFF and the light source 10 is blinking.

It goes without saying that in this case, if the hazard switch 19 is not used (NO in S9 in FIG. 8), the light sources 9 and 10 are both OFF (S11 in FIG. 8). In other words, in this case, the light sources 8, 9, and 10 are all OFF.

Note that, for example, at night, headlamp switch 22 may be switched on to turn on the headlamps 21 as required.

With the vehicle light 2 according to this embodiment, the first light guide 6 (i) is rod-shaped, (ii) includes the first extended section 61 which extends from an inboard side of the first light guide 6 relative to the widthwise direction of the vehicle 1 toward an outboard side of the first light guide 6 relative to the same and a second extended section 62 that continues from the first extended section 61, curves back inwardly, and extends to the inboard side, and (iii) opens toward the longitudinal center line of the vehicle 1. Moreover, the headlamp 21 is disposed between the first extended section 61 and the second extended section 62, and the first extended section 61 and the second extended section 62 extend toward the longitudinal center line of the vehicle 1 to a point beyond the headlamp 21.

In this way, by using a rod-shaped component that opens toward the longitudinal center line of the vehicle 1 as the first light guide 6, the orientation of the vehicle 1 with respect to the widthwise direction (left-and-right direction) of the vehicle 1 can be easily recognized. As a result, it is possible to improve the recognition rate of the width of the vehicle 1. Moreover, despite the first extended section 61 and the second extended section 62 extending to a point beyond the headlamp 21, since the headlamp 21 is disposed between the first extended section 61 and the second extended section 62 of the first light guide 6, interference between the headlamp 21 and the first light guide 6 is reduced. In other words, not only do the headlamp 21 and the first light guide 6 not physically interfere with one another, but interference of the light from the headlamp 21 and the first light guide 6 is reduced. With this, even when light is emitted into the first light guide 6 and the headlamp 21 is turned on, the width of the vehicle 1 can be easily recognized. As such, the safety of the driver, oncoming vehicles, and pedestrians can be easily ensured.

Furthermore, since the first light guide 6 is a rod-shaped component that opens toward the longitudinal center line of the vehicle 1, even in the case that one of the pair of left and right vehicle lights 2 malfunctions and cannot emit light, the orientation of the vehicle 1 with respect to the widthwise direction (left-and-right direction) of the vehicle 1 can be easily recognized. With this, an unlit vehicle light 2 can be easily identified.

Furthermore, the headlamp 21 and the first light guide 6 are housed in the same main case 5, and the vehicle light 2 includes a plurality of lighting forms including the light from the headlamp 21 and the light from the first light guide 6. With this, compared to when the headlamp 21 and the first light guide 6 are provided as separate vehicle lights, a more compact and low-cost vehicle light 2 can be achieved.

Moreover, in this embodiment, the main case 5 further houses the headlamp 21, and the headlamp 21 is disposed between (i) the first extended section 61 or the second extended section 62 of the first light guide 6 and (ii) the second light guide 7.

In this way, since the second light guide 7 is housed in the same main case 5 along with the headlamp 21 and the first light guide 6, the vehicle light 2 includes a plurality of lighting forms resulting from the combination of the light from the headlamp 21, the light from the first light guide 6, and the light from the second light guide 7. With this, compared to when the headlamp 21, the first light guide 6, and the second light guide 7 are provided as separate vehicle lights, a more compact and low-cost vehicle light 2 can be achieved.

Moreover, since the headlamp 21 is disposed between the first extended section 61 (or second extended section 62) of the first light guide 6 and the second light guide 7, interference between the headlamp 21 and the second light guide 7 in addition to the first light guide 6 can be reduced. With this, even when the headlamp 21 is turned on, the width of the vehicle 1 can be easily recognized.

Moreover, in this embodiment, the front surface of the second light guide 7 includes a textured portion for emitting, to the front surface side of the second light guide 7, the light guided by the second light guide 7.

With this, the light guided by the second light guide 7 can be emitted to the front surface side in the region 7a in which the textured portion is formed. As a result, the illumination of the second light guide 7 at the region 7a can be made to be more intense than other regions of the second light guide 7. The visibility of the second light guide 7 can therefore be increased.

Moreover, in this embodiment, the region 7a in which the textured portion is formed is a design that represents turn signal information when the light source 9 or 10, which is the second light source, emits light.

With this, when the light source 9 or 10 emits light, illumination that intensifies a design representing turn signal information can be achieved in the region 7a of the second light guide 7 in which the textured portion is formed. With this, oncoming vehicles or pedestrians can visually recognize the direction in which the vehicle 1 will turn with ease. In other words, visual recognition of the traveling direction of the vehicle 1 by oncoming vehicles or pedestrians increases. This therefore increases the safety of oncoming vehicles and pedestrians.

Moreover, in this embodiment, since the second light guide 7 is disposed so as to overlap the U-shaped portion 63 of the first light guide 6, a crossed portion is formed by the first light guide 6 and the second light guide 7 on the outboard side in the widthwise direction of the vehicle. When the light sources 8 and 9 are ON, this crossed portion is brighter than other portions of the first light guide 6 and the second light guide 7. As a result, it is possible to improve the recognition rate of the width of the vehicle. Consequently, the vehicle light 2 can be expected to be used as a light for a vehicle.

It should be noted that, as is described above, in order to effectively function as a turn signal indicator, the second light guide 7 may, for example, pass in front of the U-shaped portion 63 of the first light guide 6. However, the second light guide 7 may also pass behind the U-shaped portion 63 of the first light guide 6. In other words, the second light guide 7 may be disposed behind the first light guide first light guide so as to overlap the U-shaped portion 63 of the first light guide 6.

Moreover, in the above embodiment, the vehicle light 2 is exemplified as being installed on the front end of the vehicle 1, but the vehicle light 2 may be installed on the rear end of the vehicle 1.

Moreover, the light sources 8, 9, and 10 may be a surface mount device (SMD) type device in which one or a plurality of LED chips are mounted on a package substrate and this SMD is mounted on a substrate. The light sources 8, 9, and 10 may also be a chip on board (COB) type device in which one or a plurality of LED chips are directly mounted on a substrate.

It should be noted that when a COB type device is used, the LED chips of the light sources 9 and 10 may be mounted on the same substrate in order to achieve a more compact light source.

Moreover, in the above embodiment, LEDs (light emitting elements) that emit white light are used as the light sources 8 and 9, but the light sources 8 and 9 may be light sources that emit white light by using, for example, an LED chips that emits blue or ultraviolet light and a wavelength converting material such as a phosphor, or a light source that emits white light by having an LED chip that emits blue light, an LED chip that emits red light, and an LED chip that emits green light.

Figure 9:
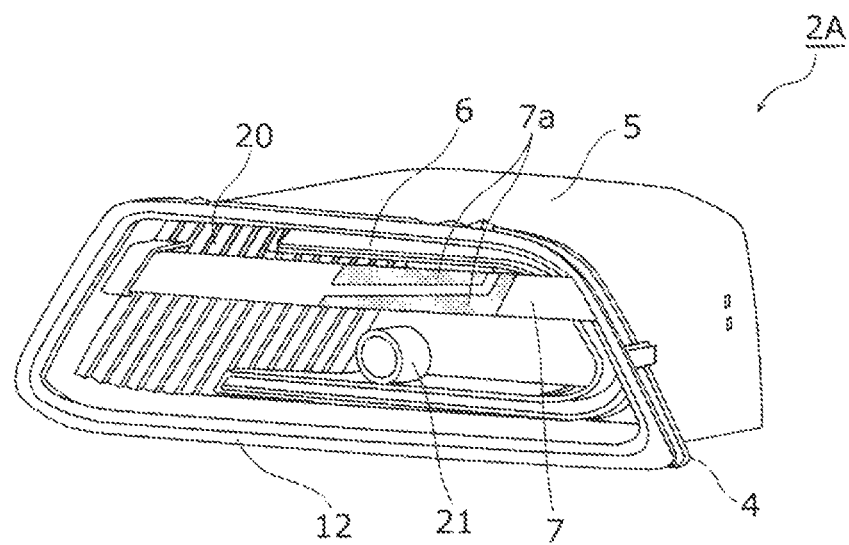
FIG. 9 is a perspective view of a vehicle light according to an example of the present invention.
Figure 10:
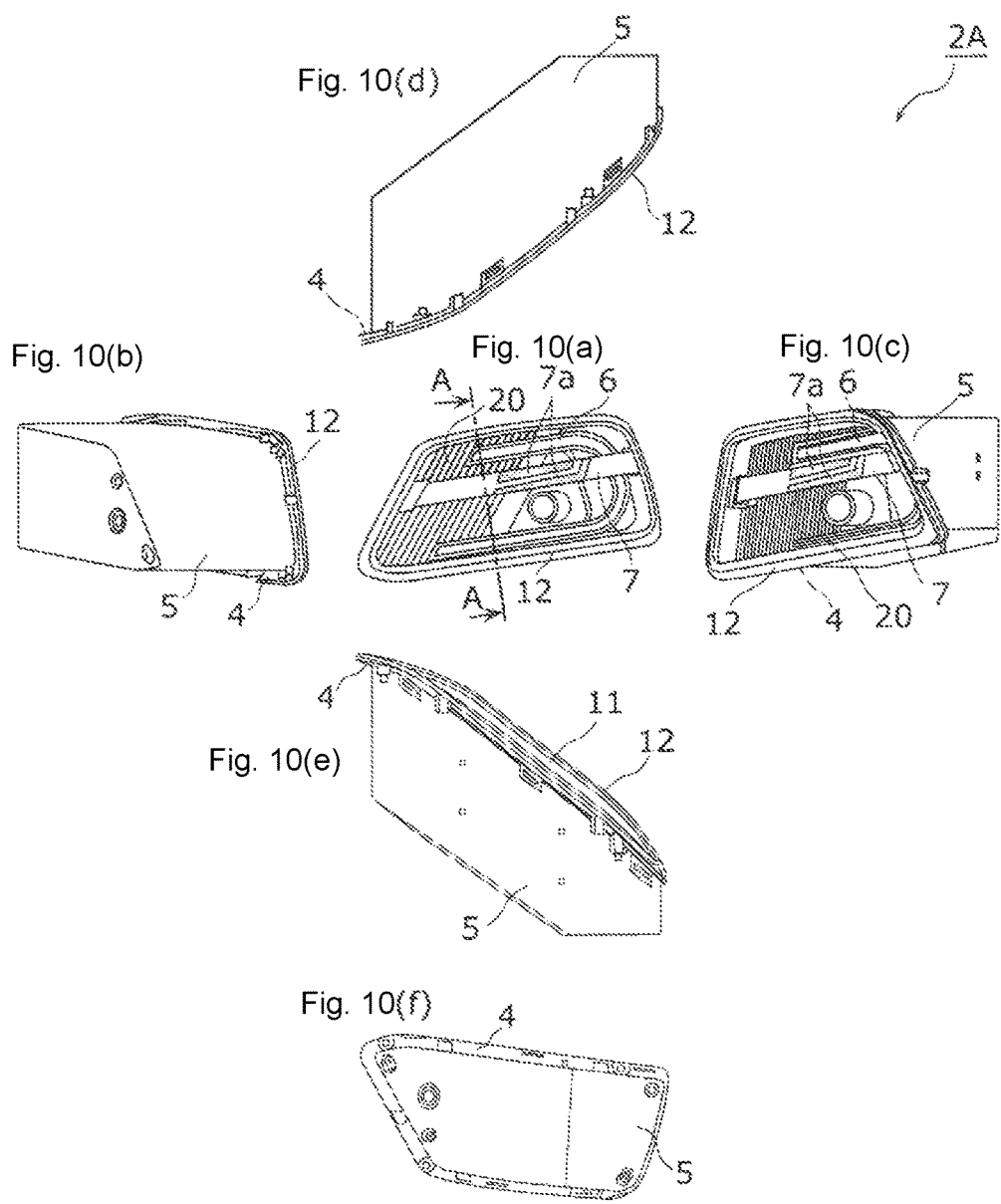
FIG. 10($a$) is a front view of a vehicle light according to Variation 1 of the present invention, FIG. 10($b$) is a left side view of the same vehicle light, FIG. 10($c$) is a right side view of the same vehicle light, FIG. 10($d$) is a top view of the same vehicle light, FIG. 10($e$) is a bottom view of the same vehicle light, and FIG. 10($f$) is a rear view of the same vehicle light.
Figure 11:
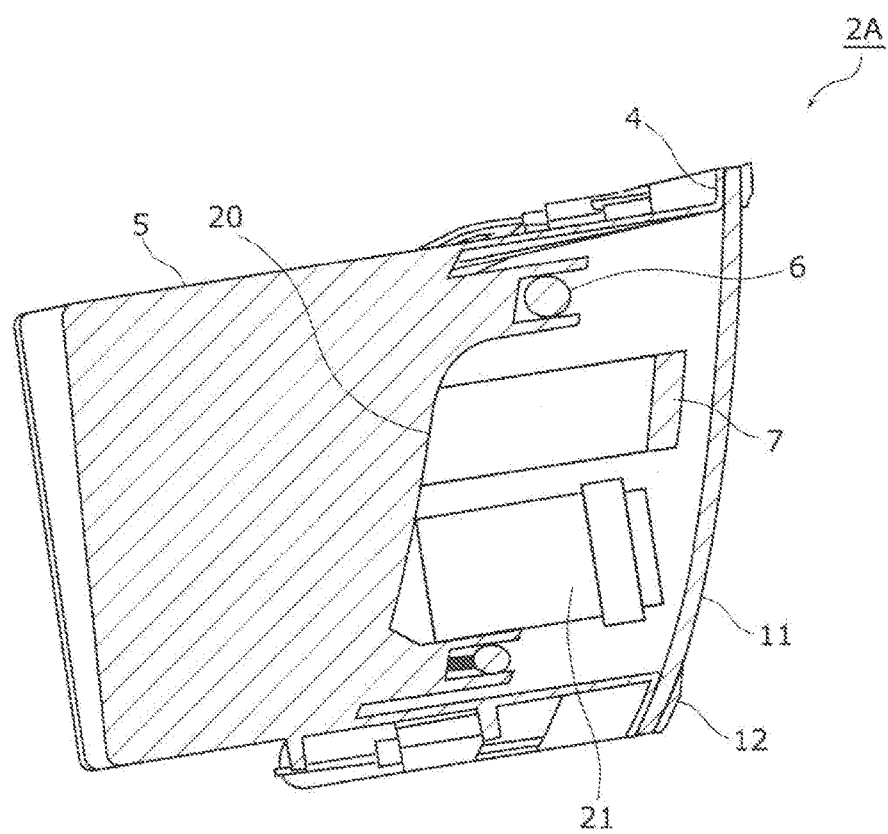
FIG. 11 is a cross sectional view of a vehicle light according to Variation 1 of the present invention at the line A-A shown in (a) in FIG. 10.

Moreover, as is the case with a vehicle light 2A according to Variation 1 illustrated in FIG. 9 through FIG. 11, a reflector 20 may be provided behind the first light guide 6 and the second light guide 7.

FIG. 9 is a perspective view of the vehicle light according to Variation 1 of the present invention. FIG. 10 shows the structure of the vehicle light according to Variation 1 of the present invention. In FIG. 10, (a) is a front view, (b) is a left side view, (c) is a right side view, (d) is a top view, (e) is a bottom view, and (f) is a rear view. FIG. 11 is a cross sectional view at the line A-A shown in (a) in FIG. 10.

In this case, it is possible to use the light from the first light guide 6 and the second light guide 7 that is emitted in directions other than forward by reflecting it forward with the reflector 20. The reflector 20 is, for example, a resin reflector plate having a metal evaporation coating on the surface of the resin. It should be noted that the reflector 20 may be made of metal. It should be noted that in FIG. 9 and FIG. 10, the portions behind the cover 11 that are visible are drawn in solid lines.

Furthermore, the reflector 20 may have ridges and grooves. By providing the reflector 20 with ridges and grooves, the embellishment of the vehicle light 2A can be increased.

Moreover, the first light guide 6, the second light guide 7, and the reflector 20 may be provided such that the end portions of the first light guide 6 and the second light guide 7 are behind the reflector 20. With this, the end portion of the first light guide 6 (the light-incident portion 13) and the end portion of the second light guide 7 (the light-incident portion 14) across from which the light sources 8, 9, and 10 are disposed can be hidden by the reflector 20.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein.

Figure 12:
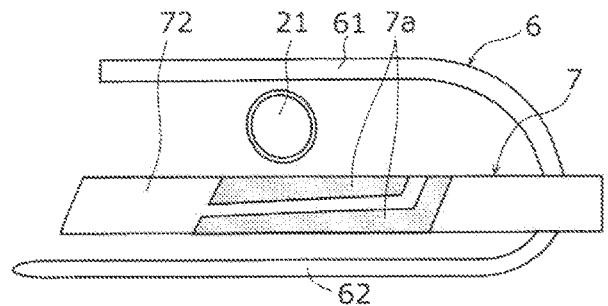
FIG. 12 is a front view illustrating a first light guide, a second light guide, and a headlamp in a vehicle light according to Variation 2 of the present invention.

For example, in the above embodiment, the headlamp 21 is disposed between the second extended section 62 of the first light guide 6 and the second extended section 72 of the second light guide 7, but as is illustrated in FIG. 12, the headlamp 21 may be disposed between the first extended section 61 of the first light guide 6 and the second extended section 72 of the second light guide 7.

Figure 13:
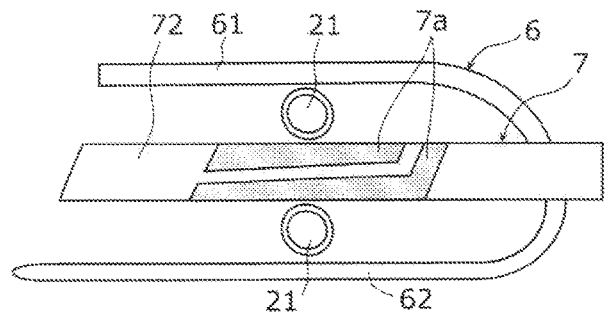
FIG. 13 is a front view illustrating a first light guide, a second light guide, and a headlamp in a vehicle light according to Variation 3 of the present invention.

Moreover, in the above embodiment, only one headlamp 21 is disposed between the second extended section 62 of the first light guide 6 and the second extended section 72 of the second light guide 7, but two or more headlamps 21 may be disposed. In this case, for example, as illustrated in FIG. 13, one headlamp 21 may be disposed between the first extended section 61 of the first light guide 6 and the second extended section 72 of the second light guide 7, and another headlamp 21 may be disposed between the second extended section 62 of the first light guide 6 and the second extended section 72 of the second light guide 7. In other words, a pair of upper and lower headlamps 21 may be disposed such that one is above the second light guide 7 (second extended section 72) and one is below the second light guide 7 (second extended section 72). Note that a plurality of headlamps 21 may be disposed either between the first extended section 61 of the first light guide 6 and the second extended section 72 of the second light guide 7 or between the second extended section 62 of the first light guide 6 and the second extended section 72 of the second light guide 7, and a plurality of headlamps 21 may be disposed between each of both of the above.

Figure 14:
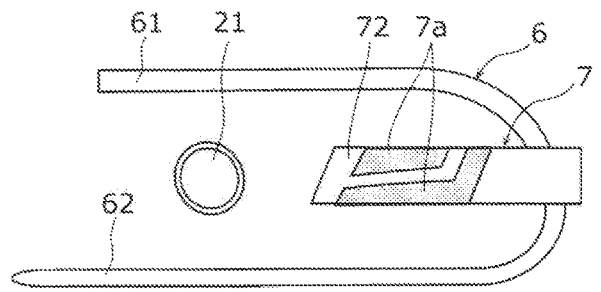
FIG. 14 is a front view illustrating a first light guide, a second light guide, and a headlamp in a vehicle light according to Variation 4 of the present invention.

Moreover, in the above embodiment, the headlamp 21 is disposed between (i) the first extended section 61 or the second extended section 62 of the first light guide 6 and (ii) the second extended section 72 of the second light guide 7, but as is illustrated in FIG. 14, the length of the second extended section 72 of the second light guide 7 may be shortened and the headlamp 21 may be horizontally aligned with the second extended section 72 of the second light guide 7. Note that in this case as well, in order to maintain the recognition rate of the width of the vehicle, as illustrated in FIG. 14, the headlamp 21 may be disposed between the first extended section 61 and the second extended section 62 of the first light guide 6, and the first extended section 61 and the second extended section 62 may extend toward the longitudinal center of the vehicle to a point beyond the headlamp 21.

Figure 15:
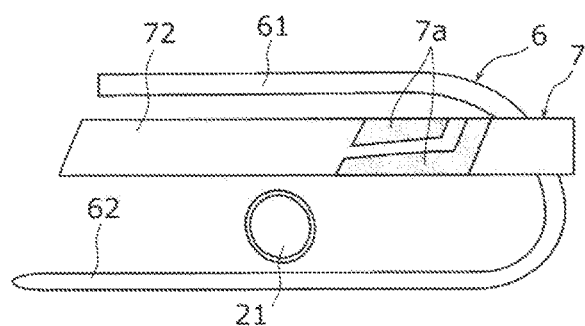
FIG. 15 is a front view illustrating a first light guide, a second light guide, and a headlamp in a vehicle light according to Variation 5 of the present invention.

Moreover, in the above embodiment, the region 7a in which the textured portion is formed in the second light guide 7 reaches a region above the headlamp 21, but as is illustrated in FIG. 15, the region 7a may not be formed in a region above the headlamp 21. With this, even when the headlamp 21 is turned on, interference between the illumination of the region 7a when light is emitted into the second light guide 7 and the light emitted by the headlamp 21 can be mitigated. This increases the visibility of the design representing the turn signal corresponding to the region 7a.

It is intended by the following claims to claim any and all modifications and variations that fall within the true scope of the present teachings.

The invention claimed is:

1. A vehicle light installed in a vehicle, the vehicle light comprising:
    a main case having a front opening;
    a first light guide disposed in the main case;
    a first light source that emits light into the first light guide; and
    a headlamp disposed in the main case,
    wherein the first light guide (i) is rod-shaped, (ii) includes a first extended section extending from an inboard side of the first light guide relative to a widthwise direction of the vehicle toward an outboard side of the first light guide relative to the widthwise direction of the vehicle and a second extended section that continues from the first extended section, curves back inwardly, and extends to the inboard side, and (iii) opens toward a longitudinal center line of the vehicle,
    the headlamp is disposed between the first extended section and the second extended section, and
    inboard ends of the first extended section and the second extended section relative to the widthwise direction of the vehicle are located closer to the longitudinal center line of the vehicle than an inboard end of the headlamp relative to the widthwise direction of the vehicle, and
    in a front view, the headlamp does not overlap with the first extended section and the second extended section.

2. A vehicle light installed in a vehicle, the vehicle light comprising:
    a main case having a front opening;
    a first light guide disposed in the main case;
    a first light source that emits light into the first light guide; and
    a headlamp disposed in the main case,
    a second light guide disposed in the main case; and
    a second light source that emits light into the second light guide,
    wherein the first light guide (i) is rod-shaped, (ii) includes a first extended section extending from an inboard side of the first light guide relative to a widthwise direction of the vehicle toward an outboard side of the first light guide relative to the widthwise direction of the vehicle and a second extended section that continues from the first extended section, curves back inwardly, and extends to the inboard side, and (iii) opens toward a longitudinal center line of the vehicle,
    the headlamp is disposed between the first extended section and the second extended section,
    the first extended section and the second extended section extend toward the longitudinal center line of the vehicle to a point beyond the headlamp,
    the second light guide is plate-shaped and disposed, at least in part, between the first extended section and the second extended section, and
    the headlamp is disposed between (i) one of the first extended section and the second extended section and (ii) the second light guide.

3. The vehicle light according to claim 2, wherein the second light guide includes, on one of a front surface and a rear surface, a textured portion for emitting, to the front surface side, light guided by the second light guide.

4. The vehicle light according to claim 3, wherein a region defined by the textured portion is a design that represents turn signal information when the second light source emits light.

5. The vehicle light according to claim 2, wherein the second light guide is disposed so as to pass one of in front of and behind a portion of the first light guide that curves back.

6. The vehicle light according to claim 1, wherein, the first light guide is configured of a single component; and the first light source is disposed facing an end surface of an inboard end of the first light guide.

* * * * *